(12) United States Patent
Belson et al.

(10) Patent No.: US 12,357,876 B2
(45) Date of Patent: *Jul. 15, 2025

(54) EXERCISE MACHINE STRUGGLE DETECTION

(71) Applicant: Tonal Systems, Inc., San Francisco, CA (US)

(72) Inventors: Brandt Belson, San Francisco, CA (US); Pavel Katkov, Samara (RU); Egor Ponomarev, Samara (RU); Giuseppe Barbalinardo, Berkeley, CA (US)

(73) Assignee: Tonal Systems, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,083

(22) Filed: May 31, 2023

(65) Prior Publication Data

US 2023/0414997 A1     Dec. 28, 2023

Related U.S. Application Data

(63) Continuation of application No. 17/714,045, filed on Apr. 5, 2022, now Pat. No. 11,701,546.

(Continued)

(51) Int. Cl.
  *A63B 24/00* (2006.01)
  *G06F 17/18* (2006.01)
  *G06N 3/045* (2023.01)

(52) U.S. Cl.
  CPC ...... *A63B 24/0006* (2013.01); *A63B 24/0062* (2013.01); *G06F 17/18* (2013.01);

(Continued)

(58) Field of Classification Search
  None
  See application file for complete search history.

(56) References Cited

U.S. PATENT DOCUMENTS 11,621,067 B1 *  4/2023  Nolan .................... G16H 50/20
                                                482/8
2006/0010142 A1  1/2006  Kim
                    (Continued)

OTHER PUBLICATIONS

Garcia-Ramos et al., Prediction of the Maximum No. of Repetitions and Repetitions in Reserve from Barbell Velocity, International Journal of Sport Physiology and Performance, Jul. 10, 2017, pp. 353-359.

(Continued)

*Primary Examiner* — Raymond L Nimox
(74) *Attorney, Agent, or Firm* — Van Pelt, Yi & James LLP

(57) ABSTRACT

Performance information associated with a previous repetition of an exercise movement is received. Performance of one or more upcoming repetitions is predicted, based at least in part on the performance information associated with the previous repetition of the exercise movement. A failure classification of whether the one or more upcoming repetitions is associated with an occurrence of physical failure is performed, based at least in part on the predicted performance of the one or more upcoming repetitions of the exercise movement. A number of repetitions in reserve is determined, based at least in part on the failure classification.

20 Claims, 3 Drawing Sheets

Related U.S. Application Data

(60) Provisional application No. 63/300,235, filed on Jan. 17, 2022.

(52) U.S. Cl.
CPC ...... G06N 3/045 (2023.01); *A63B 2024/0009* (2013.01); *A63B 2024/0068* (2013.01)

(56) References Cited

U.S. PATENT DOCUMENTS

| | | |
|---|---|---|
| 2007/0135264 A1 | 6/2007 | Rosenberg |
| 2008/0161733 A1* | 7/2008 | Einav .................. A63B 21/012 482/9 |
| 2014/0122387 A1 | 5/2014 | Chi |
| 2014/0270375 A1 | 9/2014 | Canavan |
| 2015/0151161 A1 | 6/2015 | Anderton |
| 2016/0140435 A1 | 5/2016 | Bengio |
| 2016/0148610 A1 | 5/2016 | Kennewick, Jr. |
| 2018/0021616 A1 | 1/2018 | Orady |
| 2018/0369637 A1 | 12/2018 | Hoang |
| 2019/0099632 A1 | 4/2019 | Orady |
| 2019/0134464 A1* | 5/2019 | Anderton .............. A61B 5/103 |
| 2019/0333629 A1 | 10/2019 | Torres |
| 2020/0289026 A1 | 9/2020 | Bardy |
| 2020/0356173 A1 | 11/2020 | Bajaj |
| 2021/0008413 A1* | 1/2021 | Asikainen ............. G06F 3/0304 |
| 2021/0342529 A1* | 11/2021 | Takase .................... G06N 3/04 |
| 2022/0047920 A1 | 2/2022 | Poulin |
| 2022/0080262 A1* | 3/2022 | Pluschkell ............. G06N 3/044 |

OTHER PUBLICATIONS

Khurana et al., GymCam: Detecting, Recognizing and Tracking Simultaneous Exercises in Unconstrained Scenes, Proc. ACM Interact, Mob. Wearable Ubiquitous Technol., vol. 2, No. 4, Article 185, Dec. 2018.

Slawek Smyl, A Hybrid Method of Exponential Smoothing and Recurrent Neural Networks for the Time Series Forecasting, International Journal of Forecasting 36.1, Mar. 27, 2019, pp. 75-85.

* cited by examiner

EXERCISE MACHINE STRUGGLE DETECTION

CROSS REFERENCE TO OTHER APPLICATIONS

This application is a continuation of U.S. patent application Ser. No. 17/714,045, entitled EXERCISE MACHINE STRUGGLE DETECTION filed Apr. 5, 2022 which is incorporated herein by reference for all purposes, which claims priority to U.S. Provisional Application No. 63/300,235, entitled EXERCISE MACHINE STRUGGLE DETECTION filed Jan. 17, 2022 which is incorporated herein by reference for all purposes.

This application claims priority to U.S. Provisional Patent Application No. 63/300,235 entitled EXERCISE MACHINE STRUGGLE DETECTION filed Jan. 17, 2022 which is incorporated herein by reference for all purposes.

BACKGROUND OF THE INVENTION

Strength training when done safely improves user health. Part of safe strength training is determining when a user is struggling with a repetition of an exercise movement, as this is related to physical exhaustion and failure.

BRIEF DESCRIPTION OF THE DRAWINGS

Various embodiments of the invention are disclosed in the following detailed description and the accompanying drawings.

DETAILED DESCRIPTION

Figure 1:
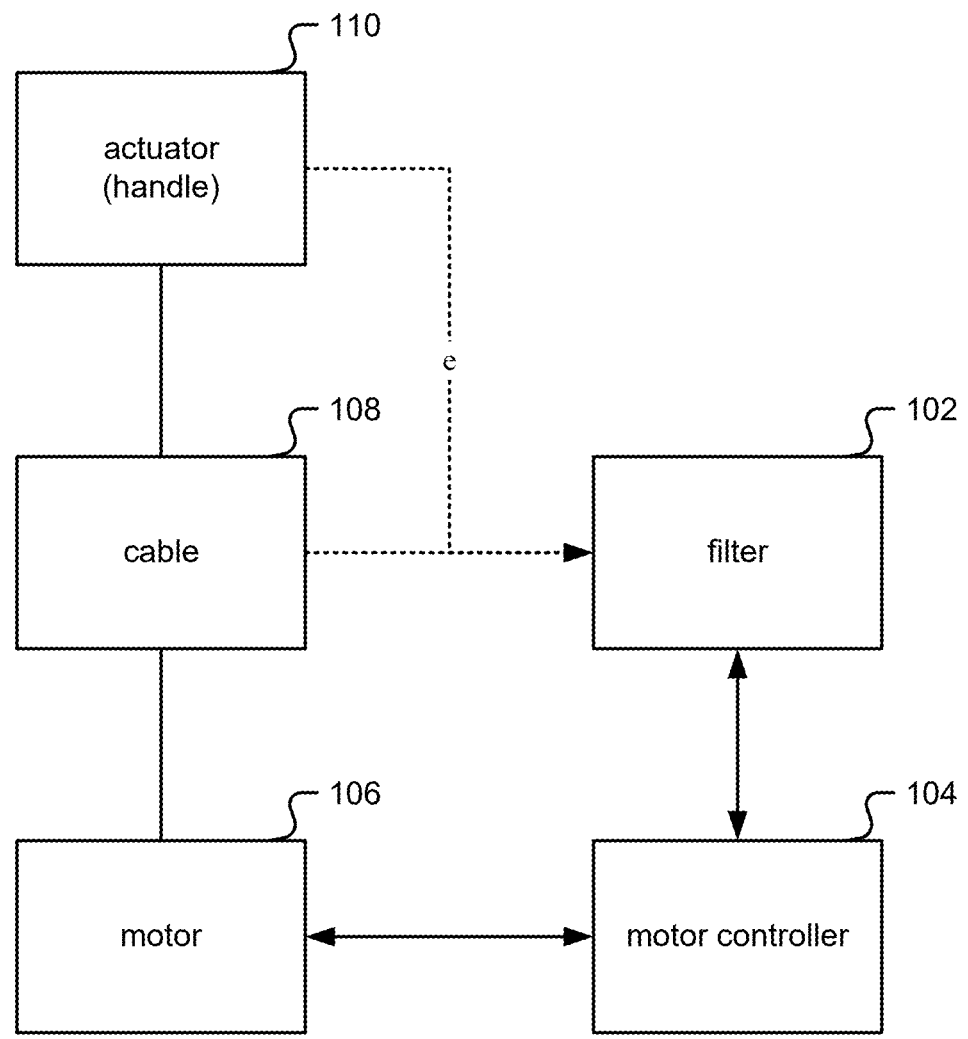
FIG. 1 is a block diagram illustrating an embodiment of an exercise machine capable of digital strength training.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Struggle detection of a user's repetition in a set of repetitions of an exercise movement is disclosed. Performance of upcoming repetitions from previous repetitions is predicted. Classifying these predicted upcoming repetitions is used to determine the "repetitions in reserve", referred to herein as the repetitions a user may perform before physical failure. In one embodiment, prediction and classification uses data science and/or heuristics.

The disclosed techniques may be used with any exercise machine, including a machine where motor torque is associated with resistance, for example using a digital strength training technique as described in U.S. Pat. No. 10,661,112 entitled DIGITAL STRENGTH TRAINING filed Jul. 20, 2017, and U.S. Pat. No. 10,335,626 entitled EXERCISE MACHINE WITH PANCAKE MOTOR filed Jul. 2, 2019, which are incorporated herein by reference for all purposes. Any person of ordinary skill in the art understands that the disclosed struggle detection techniques may be used without limitation with other strength training apparatus, and the digital strength trainer is given merely as an example embodiment.

FIG. 1 is a block diagram illustrating an embodiment of an exercise machine capable of digital strength training. The exercise machine includes the following:

- a controller circuit (104), which may include a processor, inverter, pulse-width-modulator, and/or a Variable Frequency Drive (VFD);
- a motor (106), for example a three-phase brushless DC driven by the controller circuit;
- a spool with a cable (108) wrapped around the spool and coupled to the spool. On the other end of the cable an actuator/handle (110) is coupled in order for a user to grip and pull on. The spool is coupled to the motor (106) either directly or via a shaft/belt/chain/gear mechanism. Throughout this specification, a spool may be also referred to as a "hub";
- a filter (102), to digitally control the controller circuit (104) based on receiving information from the cable (108) and/or actuator (110);
- optionally (not shown in FIG. 1) a gearbox between the motor and spool. Gearboxes multiply torque and/or friction, divide speed, and/or split power to multiple spools. Without changing the fundamentals of digital strength training, a number of combinations of motor and gearbox may be used to achieve the same end result. A cable-pulley system may be used in place of a gearbox, and/or a dual motor may be used in place of a gearbox;
- one or more of the following sensors (not shown in FIG. 1): a position encoder; a sensor to measure position of the actuator (110). Examples of position encoders include a hall effect shaft encoder, grey-code encoder on the motor/spool/cable (108), an accelerometer in the actuator/handle (110), optical sensors, position measurement sensors/methods built directly into the motor (106), and/or optical encoders. In one embodiment, an optical encoder is used with an encoding pattern that uses phase to determine direction associated with the low resolution encoder. Other options that measure back-EMF (back electromagnetic force) from the motor (106) in order to calculate position also exist;

a motor power sensor; a sensor to measure voltage and/or current being consumed by the motor (106);

a user tension sensor; a torque/tension/strain sensor and/or gauge to measure how much tension/force is being applied to the actuator (110) by the user. In one embodiment, a tension sensor is built into the cable (108). Alternatively, a strain gauge is built into the motor mount holding the motor (106). As the user pulls on the actuator (110), this translates into strain on the motor mount which is measured using a strain gauge in a Wheatstone bridge configuration. In another embodiment, the cable (108) is guided through a pulley coupled to a load cell. In another embodiment, a belt coupling the motor (106) and cable spool or gearbox (108) is guided through a pulley coupled to a load cell. In another embodiment, the resistance generated by the motor (106) is characterized based on the voltage, current, or frequency input to the motor.

In one embodiment, a three-phase brushless DC motor (106) is used with the following:

a controller circuit (104) combined with filter (102) comprising:

a processor that runs software instructions;

three pulse width modulators (PWMs), each with two channels, modulated at 20 kHz;

six transistors in an H-Bridge configuration coupled to the three PWMs;

optionally, two or three ADCs (Analog to Digital Converters) monitoring current on the H-Bridge; and/or optionally, two or three ADCs monitoring back-EMF voltage;

the three-phase brushless DC motor (106), which may include a synchronous-type and/or asynchronous-type permanent magnet motor, such that:

the motor (106) may be in an "out-runner configuration" as described below;

the motor (106) may have a maximum torque output of at least 60 Nm and a maximum speed of at least 300 RPMs;

optionally, with an encoder or other method to measure motor position;

a cable (108) wrapped around the body of the motor (106) such that entire motor (106) rotates, so the body of the motor is being used as a cable spool in one case. Thus, the motor (106) is directly coupled to a cable (108) spool. In one embodiment, the motor (106) is coupled to a cable spool via a shaft, gearbox, belt, and/or chain, allowing the diameter of the motor (106) and the diameter of the spool to be independent, as well as introducing a stage to add a set-up or step-down ratio if desired. Alternatively, the motor (106) is coupled to two spools with an apparatus in between to split or share the power between those two spools. Such an apparatus could include a differential gearbox, or a pulley configuration; and/or an actuator (110) such as a handle, a bar, a strap, or other accessory connected directly, indirectly, or via a connector such as a carabiner to the cable (108).

In some embodiments, the controller circuit (102, 1004) is programmed to drive the motor in a direction such that it draws the cable (108) towards the motor (106). The user pulls on the actuator (110) coupled to cable (108) against the direction of pull of the motor (106).

One purpose of this setup is to provide an experience to a user similar to using a traditional cable-based strength training machine, where the cable is attached to a weight stack being acted on by gravity. Rather than the user resisting the pull of gravity, they are instead resisting the pull of the motor (106).

Note that with a traditional cable-based strength training machine, a weight stack may be moving in two directions: away from the ground or towards the ground. When a user pulls with sufficient tension, the weight stack rises, and as that user reduces tension, gravity overpowers the user and the weight stack returns to the ground.

By contrast in a digital strength trainer, there is no actual weight stack. The notion of the weight stack is one modeled by the system. The physical embodiment is an actuator (110) coupled to a cable (108) coupled to a motor (106). A "weight moving" is instead translated into a motor rotating. As the circumference of the spool is known and how fast it is rotating is known, the linear motion of the cable may be calculated to provide an equivalency to the linear motion of a weight stack. Each rotation of the spool equals a linear motion of one circumference or $2\pi r$ for radius r. Likewise, torque of the motor (106) may be converted into linear force by multiplying it by radius r.

If the virtual/perceived "weight stack" is moving away from the ground, motor (106) rotates in one direction. If the "weight stack" is moving towards the ground, motor (106) rotates in the opposite direction. Note that the motor (106) is pulling towards the cable (108) onto the spool. If the cable (108) is unspooling, it is because a user has overpowered the motor (106). Thus, note a distinction between the direction the motor (106) is pulling, and the direction the motor (106) is actually turning.

If the controller circuit (102, 1004) is set to drive the motor (106) with, for example, a constant torque in the direction that spools the cable, corresponding to the same direction as a weight stack being pulled towards the ground, then this translates to a specific force/tension on the cable (108) and actuator (110). Calling this force "Target Tension", this force may be calculated as a function of torque multiplied by the radius of the spool that the cable (108) is wrapped around, accounting for any additional stages such as gear boxes or belts that may affect the relationship between cable tension and torque. If a user pulls on the actuator (110) with more force than the Target Tension, then that user overcomes the motor (106) and the cable (108) unspools moving towards that user, being the virtual equivalent of the weight stack rising. However, if that user applies less tension than the Target Tension, then the motor (106) overcomes the user and the cable (108) spools onto and moves towards the motor (106), being the virtual equivalent of the weight stack returning.

BLDC Motor. While many motors exist that run in thousands of revolutions per second, an application such as fitness equipment designed for strength training has different requirements and is by comparison a low speed, high torque type application suitable for a BLDC motor.

In one embodiment, a requirement of such a motor (106) is that a cable (108) wrapped around a spool of a given diameter, directly coupled to a motor (106), behaves like a 200 lbs weight stack, with the user pulling the cable at a maximum linear speed of 62 inches per second. A number of motor parameters may be calculated based on the diameter of the spool.

| User Requirements | | | | | | |
|---|---|---|---|---|---|---|
| Target Weight | 200 lbs | | | | | |
| Target Speed | | 62 inches/sec | = | 1.5748 meters/sec | | |

| Requirements by Spool Size | | | | | | |
|---|---|---|---|---|---|---|
| | Diameter (inches) | | | | | |
| | 3 | 5 | 6 | 7 | 8 | 9 |
| RPM | 394.7159 | 236.82954 | 197.35795 | 169.1639572 | 148.0184625 | 131.5719667 |
| Torque (Nm) | 67.79 | 112.9833333 | 135.58 | 158.1766667 | 180.7733333 | 203.37 |
| Circumference (inches) | 9.4245 | 15.7075 | 18.849 | 21.9905 | 25.132 | 28.2735 |

Thus, a motor with 67.79 Nm of force and a top speed of 395 RPM, coupled to a spool with a 3 inch diameter meets these requirements. 395 RPM is slower than most motors available, and 68 Nm is more torque than most motors on the market as well.

Hub motors are three-phase permanent magnet BLDC direct drive motors in an "out-runner" configuration: throughout this specification out-runner means that the permanent magnets are placed outside the stator rather than inside, as opposed to many motors which have a permanent magnet rotor placed on the inside of the stator as they are designed more for speed than for torque. Out-runners have the magnets on the outside, allowing for a larger magnet and pole count and are designed for torque over speed. Another way to describe an out-runner configuration is when the shaft is fixed and the body of the motor rotates.

Hub motors also tend to be "pancake style". As described herein, pancake motors are higher in diameter and lower in depth than most motors. Pancake style motors are advantageous for a wall mount, subfloor mount, and/or floor mount application where maintaining a low depth is desirable, such as a piece of fitness equipment to be mounted in a consumer's home or in an exercise facility/area. As described herein, a pancake motor is a motor that has a diameter higher than twice its depth. As described herein, a pancake motor is between and 60 centimeters in diameter, for example 22 centimeters in diameter, with a depth between 6 and 15 centimeters, for example a depth of 6.7 centimeters.

Motors may also be "direct drive", meaning that the motor does not incorporate or require a gear box stage. Many motors are inherently high speed low torque but incorporate an internal gearbox to gear down the motor to a lower speed with higher torque and may be called gear motors. Direct drive motors may be explicitly called as such to indicate that they are not gear motors.

If a motor does not exactly meet the requirements illustrated in the table above, the ratio between speed and torque may be adjusted by using gears or belts to adjust. A motor coupled to a 9" sprocket, coupled via a belt to a spool coupled to a 4.5" sprocket doubles the speed and halves the torque of the motor. Alternately, a 2:1 gear ratio may be used to accomplish the same thing. Likewise, the diameter of the spool may be adjusted to accomplish the same.

Alternately, a motor with 100× the speed and 100th the torque may also be used with a 100:1 gearbox. As such a gearbox also multiplies the friction and/or motor inertia by 100×, torque control schemes become challenging to design for fitness equipment/strength training applications. Friction may then dominate what a user experiences. In other applications friction may be present, but is low enough that it is compensated for, but when it becomes dominant, it is difficult to control for. For these reasons, direct control of motor speed and/or motor position as with BLDC motors is more appropriate for fitness equipment/strength training systems.

Figure 2:
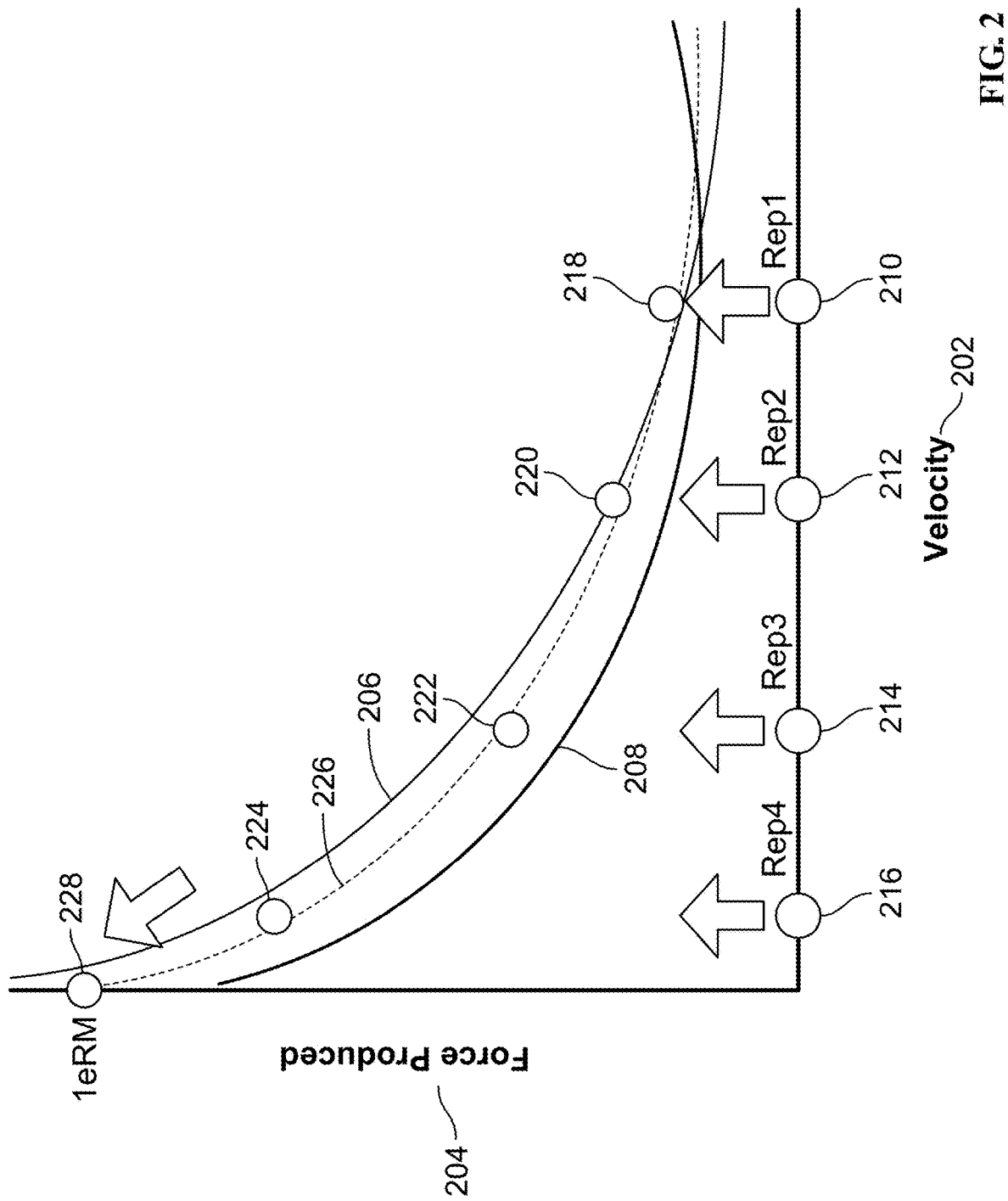
FIG. 2 illustrates an example of strength determination based on isokinetic seed movements.

FIG. 2 illustrates an example of strength determination based on isokinetic seed movements. FIG. 2 is a two-dimensional graph with an x-axis along movement velocity (202) and a y-axis along force produced (204) for that movement. For a given movement, using empirical studies one or more theoretical FVPs (206), (208) may be plotted in general for a typical human being in general, or for a typical human being of a given age, sex, and/or other demographic/physical characteristics.

Using the machine of FIG. 1, the machine prompts and manifests isokinetic seed movements for the user to perform. At least one isokinetic seed movement is needed to determine strength, and practically 3-4 of the same isokinetic seed movement at different speeds may be used to determine strength with greater accuracy. As well, 3-4 different isokinetic seed movements may be used to determine strength for different muscle groups.

From data gathered on these isokinetic seed movements, the maximum weight may be estimated as a 1 eRM for the user for movements associated with the isokinetic seed movements performed in a normal, non-isokinetic way, for example smoothly concentric and eccentric. That maximum weight may be used to estimate proper weight for multiple reps, for example 10 reps or 15 reps, of the associated movement in normal/everyday exercise.

In one embodiment, the same data for a few isokinetic seed movements may be used to recommend starting weight for a broad selection of movements that are not necessarily the isokinetic seed movements. In one embodiment, an ongoing recalibration of the strength determination is done without requiring the user to repeat the isokinetic seed movements; instead, the user's performance on each movement is used to update a user's strength level determination.

In the example shown, the machine of FIG. 1 prompts and/or demonstrates to the user how to use the handles and/or attachments (110) to perform an isokinetic seed movement. The machine may manifest three or four isokinetic seed movements for the user to perform. In one embodiment, the machine uses video prompts on a monitor, and for the isokinetic seed movement, the user mimics what they see in the video and are instructed to move the actuator (110) as fast and as powerfully as they possibly can. The machine's resistance dynamically changes to match the user's applied force, while allowing the user to move the resistance at a prescribed constant speed during the concentric phase, establishing for a given speed (210), for example 50 inches/second, a corresponding produced force (218).

The movements are selected to evaluate different muscle groups in the body, and primarily are aimed at lower body, upper body pushing, upper body pulling, and core, and to be easy to perform with proper form and low risk of injury. In one embodiment, the movements used are a seated lat pulldown, a seated overhead press, a bench press, and a neutral grip deadlift. In another embodiment, the movements used exclude bench press or could replace bench press with a movement that focuses on core/abdominal motion.

The machine generates data from these isokinetic seed movements. In one embodiment, at 50 hz, the machine adjusts the force needed to match the user and maintain a constant prescribed speed. In one embodiment, speed is varied between 20-60 inches/second, decreasing each rep. This time series data is stored during the reps in memory and also to log files that may be stored locally and/or in the cloud with an account associated with the user.

In one embodiment, a second rep of the isokinetic seed movement is performed after an appropriate rest, for example at 45 inches/second (212) a second produced force (220) is established. In one embodiment, a third rep of the isokinetic seed movement is performed after an appropriate rest, for example at 35 inches/seecond (214) a third produced force (222) is established. In one embodiment, a fourth rep of the isokinetic seed movement is performed after an appropriate rest, for example at 30 inches/second (216) a fourth produced force (224) is established.

With one data point (218) or more (220, 222, 224) data points, a FVP (226) may be estimated for the user. This FVP (226) may intercept the y-axis at point (228), which represents the 1 eRM of the user.

Thus with at least one isokinetic seed movement, and practically with 3-4 reps of an isokinetic seed movement at varying speeds, by comparing an amount of force resisted at each given velocity, extrapolation may permit a slope to be drawn and an 1 eRM determination is made based on the drawn slope. With the 1 eRM, with traditional repetition values associated with specific percentages of a 1 eRM, recommendations may be made for different weights.

The machine determines user's strength level from at least one and practically with 3-4 isokinetic seed movements on the machine. The force and speed time series data stored during the reps may be used to find the 1 eRM the user could perform at each movement. In one embodiment, noise is first removed from sensor measurements. For example, smart average-like values of the speed at which the user acted against the force of resistance are found based at least in part on historical data for a particular machine with its inherent friction/sensor noise and/or for a particular user with their anatomical and physiological past history.

The velocity and force pair determine a one rep maximum that the user can lift, using a traditional relationship/tradeoff between how much force and velocity the human body can generate as shown in FIG. 2, when isokinetic force has been historically observed/studied to determine specific FVP for a movement. The 1 eRM is the force at a speed of approximately zero in an FVP. The FVP relationship is based on data collected from many users for each movement, as the relationship varies for each different movement. Using the velocity and force pair the user performed, the 1 eRM (228) may be found by following along the FVP (226) to a near-zero velocity. In one embodiment, the user's best result is taken should they try the entire process multiple times.

Once a 1 eRM has been calculated, respective rep/weight recommendations may be made based on traditional "rep-percentage" charts which are known in the field to equate a 1 eRM to a suggested weight for 10 reps, for example.

Practical adaptation includes a suitable attenuation of a recommendation for practical reasons, for example recommending using the rep-percentage charge based on specific rep or percentages may naively recommend a user "do 10 reps at 75% of their 1 eRM". This would rate these reps at 9-10 out of 10 on a relative perceived exertion scale and physically the user may not be able to replicate the recommendation across multiple sets. Knowing this, the scale may be attenuated by 10-15% and then those values equated to accommodate physiological fatigue. A final suggestion based on a 1 eRM determination may be to "do 10 reps at (60%) of 1 eRM", which is still personalized to the user and accounts for fatigue across multiple sets, say 4-6 sets.

In one embodiment, using isokinetic seed movements of seated lat pulldown, a seated overhead press, a bench press, and a neutral grip deadlift, the list of movements with a starting strength determination and rep suggestion may be extrapolated to include those in Table 1 below:

TABLE 1

Extrapolated movements available from seed movement.

1/2 Kneeling Pallof Press
1/2 Kneeling Stability Chop
1/2 Kneeling Stability Lift
Bird Dog w/ Row
Inline Stability Chop
Inline Stability Lift
Iso Split Squat Pallof Press
Iso Split Squat Stability Chop
Iso Split Squat Stability Lift
Kneeling Cable Crunch
Lateral Bridge w/ Row
Pillar Bridge w/ Row
Pullover Crunch
Rotational Chop
Rotational Lift
Single Leg Pallof Press
Single Leg Stability Chop
Single Leg Stability Lift
Standing Pallof Press
Tall Kneeling Pallof Press
Barbell Deadlift
Barbell RDL
Bulgarian Split Squat
Front Squat
Goblet Curtsey Lunge
Goblet Reverse Lunge
Goblet Split Squat
Goblet Squat
Neutral Grip Deadlift
Pull Through
Resisted Lateral Lunge
Resisted Step Up
Single Arm, Single Leg RDL
Single Leg RDL
Split Squat
Sumo Deadlift
1/2 Kneeling Alternating Overhead Press
1/2 Kneeling Chop
1/2 Kneeling Lift
1/2 Kneeling Overhead Press
1/2 Kneeling Single Arm Overhead Press
1/2 Kneeling Single Arm Row
Alternating Bench Press
Alternating Neutral Lat Pulldown
Barbell Bent Over Row
Bench Press
Bent Over Row
Chinup
Front Raise
Hammer Curl
Inline Chest Press
Inline Chop
Inline Lift
Iso Split Squat Chest Press TABLE 1-continued Extrapolated movements available from seed movement.

Iso Split Squat Chop
Iso Split Squat Lift
Lateral Raise
Neutral Lat Pulldown
Seated Lat Pulldown
Seated Overhead Press
Seated Row
Single Arm Bench Press
Single Arm Bent Over Row
Single Leg Chop
Single Leg Standing Chest Press
Single Leg Standing Lift
Standing Barbell Overhead Press
Standing Face Pull
Standing Incline Press
Standing Overhead Press
Supinated Curl
Tall Kneeling Single Arm Chest Press
Tall Kneeling Single Arm Lat Pulldown
Tricep Extension
Tricep Kickback
Upright Row
X-Pulldown
X-Pulldown w/ Tricep Extension
Y-Pull
90-90 Arm Sweep
90-90 Hip Stretch
Alternating Bench Press
Alternating Bicep Curl
Alternating Neutral Lat Pulldown
Assisted Reverse Lunge
Assisted Squat
Barbell Bench Press
Barbell Bent Over Row
Barbell Bicep Curl
Barbell Chinup
Barbell Deadlift
Barbell Front Raise
Barbell Front Squat
Barbell Lateral Leg Raise
Barbell Lying Glute Bridge
Barbell RDL
Barbell Seated Lat Pulldown
Barbell Seated Overhead Press
Barbell Skull Crusher
Barbell Straight Arm Pulldown
Barbell Sumo Deadlift
Bar Move
Bench Chest Fly
Bench Press
Bent Hollow Rocking
Bent Knee Calf Raise
Bent Over Row
Bicep Curl
Bird Dog
Bird Dog w/ Row
Bodyweight Bulgarian Split Squat
Bodyweight Single Leg RDL
Bodyweight Split Squat
Bodyweight Squat
Bretzel Stretch
Bulgarian Split Squat
Burp
Burpee
Butt Kicker
Cat-Cow
Close Grip Barbell Bench Press
Crunch
Dead Bug
Decline Chest Fly
Elevated Glute Bridge
Elevated Single Leg Glute Bridge
External Shoulder Rotation
Farmer March
Floor Slide
Foot Elevated Lateral Bridge
Foot Elevated Pushup
Front Raise TABLE 1-continued Extrapolated movements available from seed movement.

Goblet Curtsey Lunge
Goblet Reverse Lunge
Goblet Split Squat
Goblet Squat
Half Kneeling Alternating Overhead Press
Half Kneeling Chop
Half Kneeling Lift
Half Kneeling Overhead Press
Half Kneeling Pallof Press
Half Kneeling Single Arm Overhead Press
Half Kneeling Single Arm Row
Hammer Curl
Hamstring Walkout
Handle Move
High Knee
Hip Raise
Hollow Body Rocking
Incline Chest Fly
Incline Pushup
Inline Chest Press
Inline Chop
Inline Lift
Internal Shoulder Rotation
Iso Split Squat
Iso Split Squat Chop
Iso Split Squat Lift
Iso Split Squat Pallof Press
Iso Split Squat Single Arm Chest Press
Iso Squat Hold
Jumping Jack
Jump Lunge
Jump Squat
Kneeling Cable Crunch
Kneeling Oblique Cable Crunch
Lateral Bench Jump
Lateral Bridge
Lateral Bridge w/ Rotation
Lateral Bridge w/ Row
Lateral Crawl
Lateral Lunge
Lateral Mountain Climber
Lateral Raise
Leopard Crawl
Lying Bicep Curl
Lying Face Curl
Lying Hamstring Stretch
Marching Glute Bridge
Middle Chest Fly
Mountain Climber
Mountain Climber Twist
Neutral Grip Deadlift
Neutral Lat Pulldown
Neutral Single Arm Straight Arm Pulldown
Overhead Tricep Extension
Pillar Bridge
Pillar Bridge w/ Row
Plank Jack
Plank to Toe Tap
Plank w/ Reach
Prone Shoulder Sweep
Pullover Crunch
Pull Through
Pushup
Pushup to Plank
Quad Hip Stretch
Quad Hip Stretch w/ Bench
Quadruped Hip Circle
Racked Reverse Lunge
Reach and Rotate Closer
Reach and Rotate Opener
Resisted Calf Raise
Resisted Dead Bug
Resisted Glute Bridge
Resisted Hip Raise
Resisted Lateral Lunge
Resisted Leg Lowering
Resisted Leg Raise
Resisted Step Up TABLE 1-continued Extrapolated movements available from seed movement.

Rest
Reverse Fly
Reverse Grip Barbell Bicep Curl
Reverse Grip Barbell Tricep Extension
Reverse Grip Bicep Curl
Reverse Grip Tricep Extension
Reverse Lunge
Reverse Lunge w/ Hop
Reverse Lunge w/ Single Arm Row
Rope Move
Rotational Chop
Rotational Lift
Rotational Row
Runners Lunge
Scapular Pushup
Seated Alternating Bicep Curl
Seated Alternating Overhead Press
Seated Bicep Curl
Seated Lat Pulldown
Seated Overhead Press
Seated Pallof Press
Seated Row
Seated Single Arm Lat Pulldown
Seated Single Arm Overhead Press
Shoulder Shrug
Shoulder Tap Plank
Single Arm Bench Press
Single Arm Bent Over Row
Single Arm Deadlift
Single Arm Decline Chest Fly
Single Arm Incline Chest Fly
Single Arm Lateral Leg Swing
Single Arm Resisted Leg Raise
Single Arm Single Leg RDL
Single Arm Squat w/ Row
Single Arm Tricep Extension
Single Leg Chop
Single Leg Dead Bug
Single Leg Glute Bridge
Single Leg Pallof Press
Single Leg RDL
Single Leg Standing Chest Press
Single Limb Bird Dog
Skater Bound
Skull Crusher
Spiderman Crawl
Split Squat
Sprinter Crunch
Squat Jack
Squat to Press
Squat w/ Row
Standing Alternating Push-Pull
Standing Barbell Overhead Press
Standing Chest Press
Standing Chop
Standing Decline Chest Press
Standing Face Pull
Standing Incline Press
Standing Lift
Standing Overhead Press
Standing Pallof Press
Standing Single Arm Row
Step Up
Straight Arm Pulldown
Suitcase Deadlift
Suitcase March
Suitcase Reverse Lunge
Sumo Squat Stretch
Superhero Iso Hold
Tall Kneeling Pallof Press
Tall Kneeling Single Arm Chest Press
Tall Kneeling Single Arm Lat Pulldown
Tricep Extension
Tricep Kickback
Upright Row
V-Up
Waiter March
W-Hold TABLE 1-continued Extrapolated movements available from seed movement.

Wide Grip Barbell Bench Press
X-Pulldown
X-Pulldown w/ Tricep Extension
Y-Pull

In one embodiment, a goal of the one or more isokinetic seed movements and/or seed movements from a progressive calibration is to determine a user's FVP for a user's muscle group. As described above, with an FVP there are two estimations and/or determinations that may be made. First, the FVP in part determines a 1 eRM. Second, recommended starting weights based on percentage 1 eRM charts derived through accepted industry norms are available. Again, to be sure a user does not injure themselves on their first set of 10 reps, for example their 15 rep maximum weight is instead computed and recommended, wherein the 15 rep maximum weight is the weight at which a user may do 15 reps but not 16. This 15 rep maximum weight is determined from percentage 1 eRM charts traditionally available.

For example, it is determined that a given user has a 1 eRM of 50 lb using the machine in FIG. 1 and the technique described above with isokinetic seed movements. According to a traditional percentage 1 eRM chart, a 10 rep max may use a weight equal to 75% of the 1 eRM, or 37.5 lb. This may be too heavy as the user may only be able to complete a single set of 10 reps. Instead, an adjustment between 10-15% may be made. For example, if a 10% adjustment is made associated with a 15 rep max, then 75%-10%=65% of the 1 eRM, which is 32.5 lb. The 10 rep suggestion then would be equivalent to the 15 rep max, producing the suggestion that a user do 32 lbs for 10 reps to start.

In one embodiment, determining a user's FVP for a user's muscle group is related to solving the isokinetic model:

$$F=B(t)\exp(-a(t)v)$$

wherein F and v are the produced force and movement speed, respectively.

There are at least three sets of information following from a user's FVP:

Strength Calibration—For a given movement and as described herein, given a FVP $a(t_i)$ at the range of motion given at time $t_i$ the value of $B(t_i)$ is solved for, which is the value of F at v=0, or the 1 eRM;

Strength Typing—For a given movement, strength typing involves determining an FVP $a(t_i)$ at the range of motion given at time $t_i$ for a plurality of users. The predetermined FVP, or strength typing, may be established using a pool of users who perform the given movement one or more times and using linear regression and/or other statistical modeling techniques, including, for example, a higher order polynomial-based statistical analysis; and Force-Time Prediction—For a given movement, over a range of motion and/or over time t, both the 1 eRM, or B, and LVP, or a, may vary. Force-time prediction analysis determines the corresponding variations over time and plots them as a function of index t. This in turn allows a tracking of translation and/or rotation of the actuator (110) to give coaching and correction to the user on form of an entire movement.

By isolating a force-range of motion curve as in force-time prediction, there are expected tension curves produced throughout ranges of motion. In one embodiment, capture technology including motion capture, force platforms, and inverse kinematics analysis enhances such analysis. In one embodiment, isolating these curves, parsing out sections of the range of motion to determine prime movement, and then implementing an adaptive training protocol to align those curves with expected training needed is performed. This also improves injury prediction.

Suggested Weights Logic Examples. In one embodiment, suggested weights logic and/or processing is implemented in controller circuit (104) and/or filter (102) in FIG. 1, and/or in an external device not shown in FIG. 1 and communicated to controller circuit (104) and/or filter (102). The following are examples of determining suggested weights for a user's exercise movement.

Example of Suggesting Lower Weight After Being Spotted. An exercise machine that controls motor torque to affect resistance may provide "spotting" to a user.

Consider, for example, a scenario where a user is in the middle of a concentric phase and reaches a point where they cannot complete the range of motion (ROM) because they are fatigued. This is a common scenario in weight lifting, and may be considered poor form because the user cannot complete the range of motion. However, if the system of FIG. 1 detects this scenario it may "spot" the user, analogous to a human spotter for weight lifting, for example:

1. A user begins by pulling the actuator (110) of FIG. 1 through the range of motion;
2. The user's range of motion is between pre-determined motion thresholds, for example 5% and 80%;
3. The velocity of the cable (108) of FIG. 1 drops to zero, or below some pre-determined velocity threshold close to zero;
4. Even at a low velocity, measured and/or calculated tension applied by the user is found to be above a pre-determined tension threshold for f, the perceived resistance force, based at least in part on torque exerted by motor (106) of FIG. 1;
5. The tension and low velocity persists for a pre-determined period of time, for example 0.5 seconds; and/or
6. The system responds by slowly reducing f, for example linearly over the course of 2 seconds from 100% of starting/current f to a pre-determined force threshold, for example 90% of starting for 5 lbs. Alternatively, the force is reduced at a fixed absolute rate, such as 20 lbs/sec, regardless off. As soon as velocity rises above some pre-determined velocity threshold such as 5 cm per second, m stops reducing, and a new function adjusts m through the remainder of the range of motion. Two examples of a new function is a post-spot function or a scaled version of the prior function that the user got stuck on.

In one embodiment, spotted reps are treated the same way that uncompleted reps, or "failed reps", are treated. For example a user may be in an exercise regime that includes 4 sets of 10 reps of 100 lb of a bench press movement, so each set has a "rep count" of 10 reps. In one embodiment, if a user misses this rep count by n reps, the weight is lowered to adjustWeightForRepGoal(100, 10−n+1, 12), such that the amount that the weight decreases by falls in the range of [1, 15%×base_weight] pounds, where the base_weight is 100 lb in this example. The weight is adjusted from a rep goal of 10+n−1 to a rep goal of 12 because someone who failed the rep goal had at most 1 rep in reserve, and users ideally have 2 reps in reserve at the end of a set. Given that in this example, about 10% is typically taken off, if the weight is deemed too heavy to complete the rep count, 10% of the base_weight may be defined as the minimum threshold of being spotted that is counted as a failed rep. The suggested weight may then be 90% of the base_weight for the next set, or 90 lb.

In one embodiment, if somebody is spotted on the last rep of their set, that may be considered simply a healthy way of the user pushing themselves to the limit/burning out, and so it may not be a desirable user experience to lower the weight in that case. The suggested weight for the next set may remain the last base_weight of 100 lb in this example.

In one embodiment, if somebody is spotted in a set at all, that set is not used as proof that a suggested weight should increase over the last weight/base weight. However, if somebody is spotted in a rep that comes after exceeding the "rep goal", then it may be recognized that that person was able to complete the prescribed reps at the prescribed weight, and the weight progression may be treated like a set that was completed properly. A "rep goal" as referred to herein is any goal set by user, coach, and/or system for a number of reps in a given set for a specified movement.

One example of how suggested weights may be adjusted from one set to the next in a workout in the event a user is spotted is a "Spotted Before Meeting the Rep Count Goal" protocol:

If a user is spotted at least 10% of base weight on a rep before the last rep of the rep count goal, for example, with a rep count goal of 10, spotted 10% of base weight on rep 9 or earlier, then reduce the weight to adjustWeightForRepGoal(100, 10−n+1, 12), where n is the number of missed reps, such that the amount that the weight decreases by falls in the range of [1, 15%× base_weight] pounds;

If a user is spotted at least 10% of the base weight for the first time in the set on the last rep of the rep count goal, for example with a rep count goal of 10, spotted 10% of the base weight on rep 10, spotted less than 10% of base weight on reps 1-9, then do not lower the suggested weight for the next set and/or treat the set similarly to how other sets that are spotted are treated; and/or If a user's maximum spotted weight of a set before meeting 100% of the rep count goal is less than 10% of base weight, then do not lower the suggested weight for the next set and/or treat the set similarly to how other sets that are spotted are treated.

One example of how suggested weights may be adjusted from one set to the next in a workout in the event a user is spotted is a "Spotted After Meeting The Rep Count Goal" protocol:

If a user is spotted after meeting the rep count goal, for example with a rep count goal of spotted for the first time in the set on rep 11 or later, then treat the set similarly to as how a set where the user successfully met the rep count goal without being spotted is treated. For example, with a rep goal of 10, if user is spotted on the 11th rep, treat the set as though they did unspotted reps.

Example of Suggesting Lower Weight After Long Breaks. If a user has been inactive on a strength trainer/exercise machine for a long time—for example at least three weeks, or any other period of time as appropriate—a suggested weight may be a lower weight than the last weight exercised before the long break. In one embodiment, a suggested weight may be a weight that is lowered at a higher rate than at which a suggested weight would be lower otherwise. For example, if during normal workout sessions a suggested weight was 10% lower for a failed seventh rep and 5% lower for a failed eighth rep, after a long break a similar suggested weight may be 20% lower for a failed seventh rep and 15% lower for a failed eighth rep.

Typically a user finds a home digital strength trainer one of the most convenient means of strength training, so if the exercise machine is being unused, it is unlikely that they are instead going to the gym. In one embodiment, the suggested weight for a movement is lowered if a user has not worked the muscle groups associated with that movement in at least the last three weeks or any other time period as appropriate.

In one embodiment, to start the "primary muscle group" and "secondary muscle group" of a movement are focused on, and it is determined whether either one has been worked as either a primary mover or secondary mover in at least the last three weeks. For example if a user is doing a bench press and has not worked on chest muscle groups or arm muscle groups for more than three weeks, a suggested weight may be a drop of 15% from the last bench press. In one embodiment, care is taken to not drop the weight too far, as weight progressions may not ramp the user back up to previous strength quickly enough.

As referred to herein, a "primary muscle group" is one with the highest muscle utilization value (0-100 scale) for a given movement. These are the muscles targeted by the movement and used intensely. One example is for the movement Neutral Grip Deadlift, which has Hamstrings as its primary muscle group. Another example is that of the movement Bench Press, which has a primary muscle group of Chest.

As referred to herein, a "secondary muscle group" has the second highest muscle utilization for a given movement. Secondary muscle groups are intensely used, but usually not the limiting factor in how much weight a user can lift. One example is for the movement Neutral Grip Deadlift, which has Glutes as a secondary muscle group. Another example is that of the movement Bench Press, which has Triceps as a secondary muscle group.

In one embodiment, a muscle group protocol for a user performing a move whose primary muscle group is called X, and secondary muscle group is called Y:

If muscle X has not been worked as a primary or secondary muscle in at least the last three weeks, and neither has muscle Y, then the suggested weight is a drop of the last exercised weight of that movement by 15%; and/or If muscle X or muscle Y has been worked either as a primary muscle or secondary muscle in at least the last 3 weeks, then the suggested weight is the same as the last exercised weight of that movement.

A triceps-based example of determining suggested weights based on muscle groups includes:

If a user is starting a triceps extension movement, and has done triceps-focused/triceps-primary movements such as triceps kickbacks in the past three weeks, then the suggested weight for the current triceps extension movement may be the same base weight as the last triceps extension movement, even if that took place longer than three weeks ago.

If a user is starting a triceps extension movement, and has not done any triceps-focused/triceps-primary movements such as triceps kickbacks in a month, but has done bench press movements which are triceps-secondary within the past 3 weeks, then the suggested weight for the current triceps extension movement may be the same base weight as the last triceps extension movement, even if that took place longer than three weeks ago.

If a user is starting a triceps extension movement, and has not done any triceps-focused/triceps-primary movements such as triceps kickbacks in the past 3 weeks, nor any triceps-secondary movements within the past 3 weeks, then the suggested weight for the current triceps extension movement may be to drop the next weight to max(1, 15%×base_weight) lb.

In one embodiment, key performance indicators ("KPI") are tracked and/or used to contribute to determining suggested weights. For example, detecting a decrease in a KPI representing the number of times/amount by which a user manually lowers the weight for one or more movements after they return to the exercise machine from a long break may itself trigger a suggested weight of a lower amount for all other movements.

Repetitions In Reserve. Measuring how much a user struggles enables a strength trainer to personalize experience in many ways, including more accurate suggested weights, triggered coaching media segments, improved strength estimates (such as one-rep max and strength score), and workout intensity preferences. In one embodiment, struggle detection is measured by a metric of "repetitions in reserve" ("reps in reserve", or RIR), defined herein as the number of additional reps a user could do before physical failure in a given set. For example, if a user has 2 RIR at the end of their set, they could extend the set by two reps until physical failure.

RIR is an objective and measurable quantity. RIR is thus an improvement over a traditional metric Relative Perceived Exertion ("RPE"), a measure of how difficult a set is as perceived by the user. RPE is subjective, and thus difficult to measure.

Impact to Suggested Weights. Suggesting weights for workouts, as described above, may be improved with struggle detection. For example, ignoring struggle detection if a user completes two consecutive sets at the same weight/rep goal, a suggested weight program may suggest an increased weight. With struggle detection, this suggested weight may not be sensible if the user was struggling significantly, that is, close to the point of failure, at the end of the previous set. Human physiological research shows that consistently training to failure has adverse effects on recovery, yet similar strength/hypertrophy gains may be made training to within 2-3 reps of failure without slowing down recovery or increasing risk of injury. Thus, one goal to improve user's health is that of at least 2 or more RIR at the end of a set: If the user has 2 reps in reserve or less at the end of a set, then the suggested weight for a future set should not increase. For two-sided movements such as bicep curls, if either side has a predicted RIR of 2 or less, then the suggested weight for a future set should not increase.

RIR Data Science. In one embodiment, spotted sets may be used as a training set for machine learning/statistical detection. That is, users spotted by at least 15% of the base weight probably could not have finished the rep without being spotted, so the first rep spotted more than 15% may be represented as the most they could do. Thus, the reps in reserve of every rep prior to the spotted rep is how many reps away it was from the spotted rep. For example, if a user is spotted by more than 15% on rep 5, then the user is declared able to do 4 reps before physical failure, and the first rep has 3 RIR, the second rep has 2 RIR, the third rep has 1 RIR, and the fourth rep has 0 RIR. Other examples of training sets include manual labeling with video paired with sensor data, running controlled experiments, user-reported RIR and heart rate-based data.

RIR Predict and Classify. Predicting features such as range of motion, max/mean speeds, rep duration and other metrics for a next repetition or repetitions is disclosed. In one embodiment, a history including millions or billions of historical reps is used to predict the features of the next rep or reps in the set. For example, to predict the ROM of the next rep in a set, the following features may be used: user features, as well as attributes of all previous reps, including: ROM, max concentric speed, mean concentric speed, concentric duration, duration between concentric and eccentric phases, duration between eccentric and concentric phases, max eccentric speed, mean eccentric speed, and more. These may also be combined into various permutations to create many more features, such as ratios of speeds within a rep or across different reps. Another feature is relative muscle volume, a measure of fatigue within the set, and/or rest time before rep. Relative muscle volume of a set as referred to herein is determined by:

$$\text{relative muscle volume} = \\ \text{num·reps} \times \frac{\text{weight}}{1RM} \times \text{muscle\_utilization} \times (1 + \text{is\_bilateral}) = \\ \text{num·reps} \times 1RM\_\text{fraction} \times \text{muscle\_utilization} \times (1 + \text{is\_bilateral})$$

wherein 1RM is the one rep maximum for a given movement and muscle utilization is the muscle utilization value for a given movement for a muscle group such as a primary muscle group or secondary muscle group and is bilateral is zero for unilateral movements and one for bilateral or two-sided movements. If, for example, we consider an exercise with 10% of chest utilization and 90% of shoulder utilization, when a user performs 10 reps at 80% of its 1RM, the relative muscle volume for the chest is 0.8*0.1*10=0.8, while the relative muscle volume for the shoulders is 0.8*0.9*10=7.2.

This is an improvement of the challenges of estimating RIR directly from rep and time series data, which may be biased negatively because of a small training set where a user was doing max effort and reached failure and not, for example, distracted by non-workout incidents at home.

Breaking the problem of determining RIR into two parts is disclosed:
a. Predicting next reps. Predicting range of motion, max/mean speeds, and other features associated with fatigue and/or struggle for the next rep or few reps. The step of prediction may use a larger training set labeled at lower cost, using every user workout set.
b. Classifying failure. Given the predicted features, classifying on whether or not the user has physically failed on that rep. In one embodiment, a threshold and/or heuristic approach is used to classify physical failure. In an alternate embodiment, a logistic regression is used with fewer features. The training set for classification may be derived from maximal effort reps/sets where the user is known to have reached physical failure, as well as reps/sets where the user is known to not have reached physical failure. This classification model may then be applied to both real and predicted reps, as produced by the model mentioned above.

RIR Prediction of Next Rep Features. Predicting one or more performance characteristics about an upcoming rep given data about previous reps is disclosed. Prediction may be applied multiple times recursively, that is the output prediction being an input for a next rep's prediction, such that several reps into the future may be predicted. A human coaching cap may be implemented to limit prediction of a user's next 4-5 reps as any more than 4-5 reps is likely to result in reduced accuracy, similar to that of a human coach.

Features that are input to the prediction include at least one of the following:
  range of motion for previous reps;
  max/mean speeds for previous reps;
  duration of previous rep phases (e.g. concentric and eccentric phases) and entire rep;
  user features (e.g. muscle readiness before a workout);
  relative muscle volume;
  rest time before reps;
  duration or rep goal;
  elapsed duration or rep count;
  movement info (e.g. target muscle groups, bilateral movement or unilateral movement) and
  user info (e.g. height and weight).

Labels that are an output from the prediction include one or more of the following:
  range of motion for a next rep;
  max/mean speeds for a next rep; and
  duration of rep phases and entire rep for a next rep.

Possible models for prediction include one or more of the following:
  linear regression modeling;
  lasso regression modeling, including by adding measures of fatigue and aggregated data, where lasso shrinkage may be used for dimensionality reduction;
  deep learning modeling;
  deep learning (temporal) sequence modeling;
  deep learning sequence modeling using recurrent neural networks ("RNN"), for example long short-term memory ("LSTM"); and/or
  deep learning sequence modeling using diluted neural networks, for example Wavenet, including with only a few hidden layers.

This prediction step may be thought of analogous to techniques using a natural language "upcoming word" or next word prediction architecture, such as those used in modern search engines. This lightweight prediction architecture is an improvement over large neutral network and/or machine learning as it has lower processing, memory, storage, and/or network requirements and can be enabled within a mobile architecture such as a mobile tablet environment like Android or iOS. In one embodiment, a training set for the prediction is based at least in part on another rep, for example a predicted rep or a rep based on a recently performed set. In one embodiment, the training set is filtered to remove out for example sets where the user was obviously distracted, e.g., when they put down the exercise machine actuator to deal with issues outside of fitness training.

RIR Classification of Physical Failure. Given the data for a rep and all the previous reps, classify if the user failed the rep. The improvement of the predict and classify two-step process (over a single regression model) is that its partitioned two steps enable using almost the entire dataset as training and validation for the complex prediction model without labeling, and a much smaller and simpler dataset to train the simpler classification of failure model. This is an improvement because it requires less processing, memory, storage, and/or network requirements and may be enabled within a lightweight/mobile architecture. Thus, the step of classification is not predicting if a next rep will fail, but rather classifies if a user physically fails a rep given actual features in the completed/attempted/predicted rep.

Physical failure, as referred to herein, is when a user demonstrates visibly and/or significantly degraded performance. To illustrate the term "physical failure" are referred to herein, imagine a hypothetical situation; a user is working out and a human trainer is observing them. The user is absolutely determined to do as many reps as possible, and unlike traditional training techniques the trainer wants them to stop only after they have reached their physical limit and their performance is visibly and significantly degraded. The user struggles, even slows at one point, but then seems to have resurgence and does more reps at a faster speed, completely mentally determined to keep going. Eventually their muscles start to give out and they cannot lift the weight up again, their speed and ROM decreasing substantially. At that point, the trainer recognizes that further attempted reps are pointless because the only way the person can continue is by recruiting other muscles and sacrificing good form. This final point is physical failure and RIR=0. Other variations on this definition are possible, and may still fit within the modeling framework described above.

Visible symptoms of a user reaching physical failure include:
  slowing down during a concentric phase, which may engage a spotter if slow enough;
  speeding up during an eccentric phase, even dropping the actuator such as handles/bar/rope;
  longer rests between reps or very long rests over an overall workout/set. For example, one rep after a huge rest may be ok, but not more, which may stop someone at that point at RIR=0. For example, a five second rest or less may be a cutoff assuming they were going faster before;
  range of motion reduction between reps;
  sacrificing form, referred herein as "cheating", to recruit other muscles like twisting the body on a single arm row;

There are prior factors and information that may slightly increase/decrease the probability of failure, which may be detected and or input:
  Sleep length and/or sleep quality;
  Muscle fatigue from using the same or similar muscle group earlier in a current workout;
  Lack of stability and/or shaking limbs, for example a stabilizer giving out such as a user's core giving out in a goblet squat may cause a "butt tuck" degradation. Another example during a bench press movement is when hands shake; and
  Cardio and central nervous system ("CNS") fatigue from doing a lot of volume and/or not resting much between sets, even when using different muscle groups.

To be explicit on what physical failure is not, it is not mental failure. For example, it is possible a person ends a set because they think they cannot do another rep or just are not feeling like it, and that is not considered physical failure by the definition herein. The final RIR result should be greater than zero in this case of mental failure. Similarly, maximum relative perceived exertion ("RPE") is not failure, and RPE is not RIR. A user may state that a set was extremely difficult but if they were to actually push themselves to do more reps, it is possible they could have done more before physically failing. Finally, the point where a user traditionally should stop doing reps for an effective and safe workout is not physical failure, and physical failure generally involves more reps to get to RIR=0.

Features that are input to the classification include at least one of the following elements of performance information about previous one or more repetitions, either actual repetitions or repetitions predicted in the first step above:
  range of motion for a previous rep;
  max/mean speeds for a previous rep;
  duration of previous rep phases and entire previous rep;
  rest time before a previous rep;
  rest time between sets including the previous rep;
  movement information (e.g. push or pull) and/or relative muscle volume for:
    a same muscle group in a given workout;
    a same muscle group in recent days, and/or a measure of "muscle readiness";
    across all muscle groups in workout; and
    across all muscle groups in recent days.

Labels that are output to the classification include flagging a given repetition as a failed repetition or not a failed repetition. In one embodiment, classification may also include flagging a given repetition as a successful repetition.

The definition of the failure label may be simplified to improve computing efficiency and increase processing speed if it correlates reasonably with estimating useful RIR. To label a training set of failure and "not failure", time series sequence plots of overall actuator/cable data over one user and/or all users may be used since many symptoms may be seen in these plots. A majority of sets do not have failure, so "auto labeling" obvious cases with simple heuristics may reduce the time needed to label. For example, in a training set if the range of motion does not decrease, the max concentric speed stays above a threshold in all reps, and/or the duration of reps stays below some threshold and/or does not increase, then the set may be simply classified as not failure.

On the remaining training sets that are not automatically labeled as not failure, a much higher percentage will have actual failure, and may be randomly sampled for labeling to avoid bias and overfitting, and/or it may be only a few hundred labels of failure/not failure are needed for each group of movement.

Possible models for classification include one or more of the following:
  Thresholds and/or heuristics;
  Logistic regression; and
  Methods based on decision trees (e.g. Random Forest or Extreme Gradient Boosting)

Figure 3:
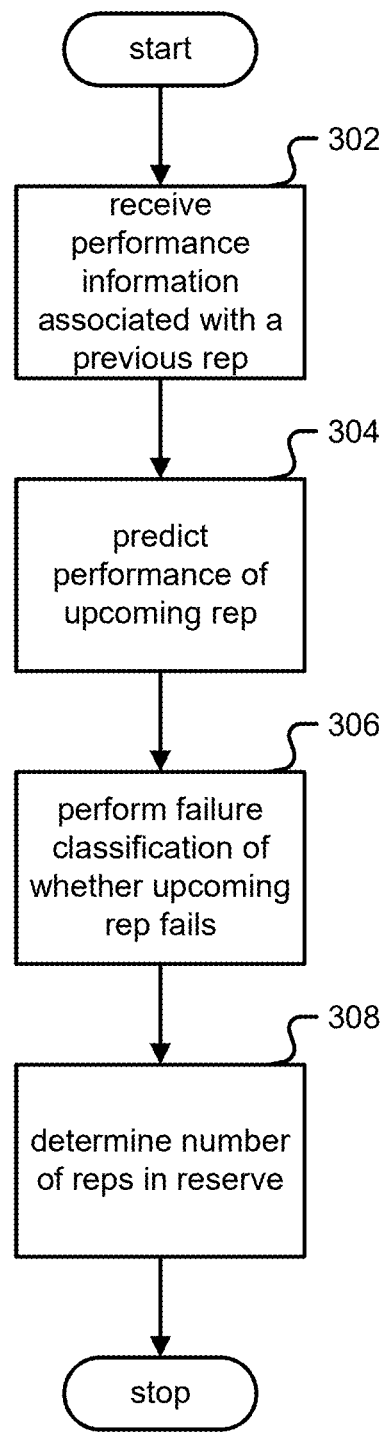
FIG. 3 is a flow diagram illustrating an embodiment of a process for struggle detection.

FIG. 3 is a flow diagram illustrating an embodiment of a process for struggle detection. In one embodiment, controller circuit (104) and/or filter (102) in FIG. 1 carries out the process of FIG. 3. In one embodiment, an external device not shown in FIG. 1 carries out the process of FIG. 3 and communicates to controller circuit (104) and/or filter (102) of FIG. 1.

In step (302), performance information associated with one or more previous repetitions of an exercise movement is received. In one embodiment, the performance information and/or feature comprises at least one of the following: maximum concentric velocity of the previous repetition, maximum eccentric velocity of the previous repetition, change in maximum concentric/eccentric velocity between the previous repetition and a preceding repetition, change in maximum concentric/eccentric velocity from a set average, average concentric/eccentric velocity of the previous repetition, change in average concentric/eccentric velocity from the previous repetition, change in average concentric/eccentric velocity from the set average, duration of concentric/eccentric phase of the previous repetition, change in duration from the previous repetition, change in duration from the set average, range of motion for the previous repetition, change in range of motion from the previous repetition, change in range of motion from the set average, mid-repetition pause, mid-repetition pause in previous rest, mid-repetition pause in average repetition, distance covered, user features, relative muscle volume, rest time before repetitions, repetition goal, elapsed duration, movement information, user information, exercise movement form information, and/or spotter engagement.

In one embodiment, predicting performance comprises using at least one of the following: a deep learning model architecture, a lasso regression, and a linear regression. In one embodiment, predicting performance comprises using a sequence model architecture. In one embodiment, predicting performance comprises using at least one of the following: a recurrent neural network (RNN) architecture, and a diluted neural network architecture. In one embodiment, predicting performance comprises using at least one of the following: a long short-term memory (LSTM) architecture, and a WaveNet architecture with a reduced number of hidden layers. In one embodiment, predicting performance comprises using a natural language upcoming word prediction architecture. In one embodiment, predicting performance comprises using a small neutral network architecture contained inside a mobile tablet environment. In one embodiment, predicting performance comprises using a training set based at least in part on another repetition. In one embodiment, predicting performance comprises using a filtered training set based at least in part on another repetition.

In one embodiment, predicting performance comprises an output and/or label with at least one of the following: a range of motion for the one or more upcoming repetitions, a maximum concentric/eccentric velocity for the one or more upcoming repetitions, an average concentric/eccentric velocity for the one or more upcoming repetitions, and/or a duration of a concentric/eccentric phase for the one or more upcoming repetitions.

In step (304), performance of one or more upcoming repetitions is predicted based at least in part on the performance information associated with the previous repetition of the exercise movement. In one embodiment, the "one or more upcoming repetitions" is between 1 and 5 upcoming repetitions.

In step (306), a failure classification of whether the one or more upcoming repetitions is associated with an occurrence of physical failure is performed based at least in part on the predicted performance of the one or more upcoming repetitions of the exercise movement. In one embodiment, performing a failure classification comprises using prior information of at least one of the following: user information regarding sleep, relative muscle volume for a currently used muscle group, and exercise movement form information.

In one embodiment, performing a failure classification comprises using symptoms of at least one of the following: reduced velocity during a concentric phase, increased velocity during an eccentric phase, longer rests between repetitions, reduced range of motion. In one embodiment, performing a failure classification comprises an output with at least one of the following: a label of a successful repetition, and a label of a physically failed repetition. In one embodiment, performing a failure classification comprises using at least one of the following: a heuristic, a logistic regression architecture, and a random decision forest architecture.

In step (308), a number of repetitions in reserve ("RIR") is determined, based at least in part on the failure classification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   creating a neural network architecture;
   training the neural network architecture at least in part with performance information associated with a previous repetition of an exercise movement;
   predicting performance, including a predicted speed, of one or more upcoming repetitions based at least in part on the performance information, including a previous speed, associated with the previous repetition of the exercise movement by labeling the one or more upcoming repetitions using the neural network architecture based at least in part on features of a current repetition;
   wherein the previous speed is measured using a sensor coupled to an actuator for the exercise movement, and wherein the sensor is configured to measure position of the actuator;
   performing a failure classification of whether the one or more upcoming repetitions is associated with an occurrence of physical failure based at least in part on the predicted speed of the one or more upcoming repetitions of the exercise movement;
   determining a number of repetitions in reserve based at least in part on the failure classification;
   determining a future suggested weight based at least in part on the number of repetitions in reserve; and
   controlling a motor controller to adjust a perceived weight stack associated with a motor to the future suggested weight.

2. The method of claim 1, wherein the one or more upcoming repetitions is between 1 and 5 upcoming repetitions.

3. The method of claim 1, wherein the performance information comprises at least one of the following: maximum concentric velocity of the previous repetition, maximum eccentric velocity of the previous repetition, change in maximum concentric/eccentric velocity between the previous repetition and a preceding repetition, change in maximum concentric/eccentric velocity from a set average, average concentric/eccentric velocity of the previous repetition, change in average concentric/eccentric velocity from the previous repetition, change in average concentric/eccentric velocity from the set average, duration of concentric/eccentric phase of the previous repetition, change in duration from the previous repetition, change in duration from the set average, range of motion for the previous repetition, change in range of motion from the previous repetition, change in range of motion from the set average, mid-repetition pause, mid-repetition pause in previous rest, mid-repetition pause in average repetition, distance covered, user features, relative muscle volume, rest time before repetitions, repetition goal, elapsed duration, movement information, user information, exercise movement form information, and spotter engagement.

4. The method of claim 1, wherein predicting performance comprises using at least one of the following: a deep learning model architecture, a lasso regression, and a linear regression.

5. The method of claim 1, wherein predicting performance comprises using a sequence model architecture.

6. The method of claim 1, wherein predicting performance comprises using at least one of the following: a recurrent neural network (RNN) architecture, and a diluted neural network architecture.

7. The method of claim 1, wherein predicting performance comprises using at least one of the following: a long short-term memory (LSTM) architecture, and a WaveNet architecture with a reduced number of hidden layers.

8. The method of claim 1, wherein predicting performance comprises using a natural language upcoming word prediction architecture.

9. The method of claim 1, wherein predicting performance comprises using a small neutral network architecture contained inside a mobile tablet environment.

10. The method of claim 1, wherein predicting performance comprises using a training set based at least in part on another repetition.

11. The method of claim 1, wherein predicting performance comprises using a filtered training set based at least in part on another repetition.

12. The method of claim 1, wherein predicting performance comprises an output with at least one of the following: a range of motion for the one or more upcoming repetitions, a maximum concentric/eccentric velocity for the one or more upcoming repetitions, an average concentric/eccentric velocity for the one or more upcoming repetitions, and a duration of a concentric/eccentric phase for the one or more upcoming repetitions.

13. The method of claim 1, wherein performing a failure classification comprises using at least one of the following: a heuristic, a logistic regression architecture, and a random decision forest architecture.

14. The method of claim 1, wherein performing a failure classification comprises an output with at least one of the following: a label of a successful repetition, and a label of a physically failed repetition.

15. The method of claim 1, wherein performing a failure classification comprises using symptoms of at least one of the following: reduced velocity during a concentric phase, increased velocity during an eccentric phase, longer rests between repetitions, reduced range of motion.

16. The method of claim 1, wherein performing a failure classification comprises using prior information of at least one of the following: user information regarding sleep, relative muscle volume for a currently used muscle group, and exercise movement form information.

17. A system, comprising:
a motor controller;
a processor coupled to the motor controller and configured to:
create a neural network architecture;
train the neural network architecture at least in part with performance information associated with a previous repetition of an exercise movement;
predict performance, including a predicted speed, of one or more upcoming repetitions based at least in part on the performance information, including a previous speed, associated with the previous repetition of the exercise movement by labeling the one or more upcoming repetitions using the neural network architecture based at least in part on features of a current repetition;
wherein the previous speed is measured using a sensor coupled to an actuator for the exercise movement, and wherein the sensor is configured to measure position of the actuator;
perform a failure classification of whether the one or more upcoming repetitions is associated with an occurrence of physical failure based at least in part on the predicted speed of the one or more upcoming repetitions of the exercise movement;
determine a number of repetitions in reserve based at least in part on the failure classification
determine a future suggested weight based at least in part on the number of repetitions in reserve; and
control the motor controller to adjust a perceived weight stack associated with a motor to the future suggested weight; and
a memory coupled to the processor and configured to provide the processor with instructions.

18. The system of claim 17, wherein the one or more upcoming repetitions is between 1 and 5 upcoming repetitions.

19. A computer program product embodied in a non-transitory computer readable medium and comprising computer instructions for:
creating a neural network architecture;
training the neural network architecture at least in part with performance information associated with a previous repetition of an exercise movement;
predicting performance, including a predicted speed, of one or more upcoming repetitions based at least in part on the performance information, including a previous speed, associated with the previous repetition of the exercise movement by labeling the one or more upcoming repetitions using the neural network architecture based at least in part on features of a current repetition;
wherein the previous speed is measured using a sensor coupled to an actuator for the exercise movement, and wherein the sensor is configured to measure position of the actuator;
performing a failure classification of whether the one or more upcoming repetitions is associated with an occurrence of physical failure based at least in part on the predicted speed of the one or more upcoming repetitions of the exercise movement;
determining a number of repetitions in reserve based at least in part on the failure classification;
determining a future suggested weight based at least in part on the number of repetitions in reserve; and
controlling a motor controller to adjust a perceived weight stack associated with a motor to the future suggested weight.

20. The computer program product of claim 19, wherein the one or more upcoming repetitions is between 1 and 5 upcoming repetitions.

* * * * *